United States Patent
O'Brien

(10) Patent No.: US 6,601,031 B1
(45) Date of Patent: Jul. 29, 2003

(54) SPEECH RECOGNITION FRONT END CONTROLLER TO VOICE MAIL SYSTEMS

(75) Inventor: Stephen Anthony O'Brien, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 107 days.

(21) Appl. No.: 09/627,286

(22) Filed: Jul. 28, 2000

Related U.S. Application Data
(60) Provisional application No. 60/176,173, filed on Jan. 13, 2000.

(51) Int. Cl.[7] ............................................... G10L 21/06
(52) U.S. Cl. .................. 704/270.1; 704/275; 379/88.18
(58) Field of Search ................................. 704/270, 275, 704/270.1; 379/88.01, 88.02, 88.04, 88.22, 88.23, 88.18, 389, 67.1

(56) References Cited

U.S. PATENT DOCUMENTS

| | | | |
|---|---|---|---|
| 5,757,806 A * | 5/1998 | Koyama et al. ............. | 370/535 |
| 5,915,001 A * | 6/1999 | Uppaluru .................. | 379/88.22 |
| 6,088,428 A * | 7/2000 | Trandal et al. ........... | 379/88.02 |
| 6,094,476 A * | 7/2000 | Hunt et al. ............... | 379/88.04 |
| 6,208,959 B1 * | 3/2001 | Jonsson et al. ............. | 704/209 |
| 6,304,573 B1 * | 10/2001 | Hicks, III .................... | 370/401 |
| 6,308,062 B1 * | 10/2001 | Chien et al. ................. | 455/420 |
| 6,366,669 B1 * | 4/2002 | Meynekhdrun ............. | 379/359 |
| 6,370,238 B1 * | 4/2002 | Samsone et al. ......... | 379/88.23 |
| 6,370,506 B1 * | 4/2002 | Ahluwalia ................... | 704/275 |
| 6,377,662 B1 * | 4/2002 | Hunt et al. ............... | 379/88.01 |
| 6,377,825 B1 * | 4/2002 | Kennedy et al. ............ | 455/569 |
| 6,385,304 B1 * | 5/2002 | Hunt et al. ............... | 379/88.01 |
| 6,385,585 B1 * | 5/2002 | Jonsson et al. ............. | 704/275 |
| 6,396,909 B1 * | 5/2002 | Reksten et al. .......... | 379/88.18 |
| 6,459,774 B1 * | 10/2002 | Ball et al. .................. | 379/67.1 |

* cited by examiner

*Primary Examiner*—Susan McFadden

(57) ABSTRACT

A speech recognition system front end interface to provide a subscriber voice control over many voice mail functions. The speech recognition system converts spoken instructions into DTMF instructions for voice mail systems while allowing prompts form the voice mail system and DTMF tones from the subscriber to pass through without any interference by the speech recognition system. To accomplish these pass through functions, the speech recognition system sets up what is know as a hairpin connection between the subscriber, the speech recognition system and the voice mail system.

11 Claims, 6 Drawing Sheets

SPEECH RECOGNITION FRONT END CONTROLLER TO VOICE MAIL SYSTEMS

CROSS-REFERENCE TO RELATED APPLICATION

This application claims priority of Provisional Application Serial No. 60/176,173, which was filed Jan. 13, 2000.

TECHNICAL FIELD

This invention relates to a speech recognition system and more particularly to a speech recognition system that provides control information to a further system, such as a voice mail system.

BACKGROUND OF THE INVENTION

Voice mail systems, also known as voice messaging systems, have been in use for decades. They are so well known and so useful that voice mail systems are found almost everywhere. Voice mail system (VMS) 5 shown in FIG. 1 is such a system. Examples for VMSs for commercial use are the Sierra system originally from Octel, now from Lucent Technologies, 600 Mountain Avenue, Murray Hill, N.J. Such systems are not only found in businesses, but now commercial counterparts are also in found in private homes where individuals can subscribe to voice mail boxes or buy answering machines. Historically both voice mail systems and answering machines have been controlled by DTMF signals generated from a touch button keypad and sent over a network. These DTMF signals control playback, delete, skip, forward, reply, change greetings, help, and similar voice mail system control functions. The trouble of using a push button key pad and keeping all the numbers straight has left many subscribers/users with a desire for something better and easier to use.

There is growing interest in providing speech recognition control to VMSs. This interest may be due to competition in the voice mail market or due to the growing need for "hands-free" services to mobile users. Though there may be a strong desire to provide speech recognition, it must also be recognized that many companies have a significant investment in their legacy VMSs. These companies are not interested in discarding their present systems. Nor are many of them rushing out to make even more significant investments in next generation VMSs, such as voice mail system 5' shown in FIG. 2, which has speech recognition hardware and software built in. These companies would rather use speech recognition as an enhanced service offering paid for by a service provider, but want the service at a reasonable price.

Besides adding speech recognition to the information left at a voice mail system, improvements to the interface to the Voice Mail system might be possible through a control link of some kind. Such a control link might tie the voice mail system to a Speech Recognition System through voice and control links. Presently, it is difficult to interface to existing voice mail systems at the control level beyond the DTMF level. Existing voice mail systems generally provide proprietary internal software and hardware interfaces that would be technically difficult to interface to. Interfacing through these existing voice mail interfaces would require significant development, require control and data interfaces to the voice mail system, and the end result would be a questionable service probably with delays. Therefore, it is desirable to provide a method and apparatus that would do away with the control interface issue.

SUMMARY OF THE INVENTION

Briefly stated in accordance with one aspect of the invention, the aforementioned long felt needs are addressed by providing a speech recognition system (SRS) that is used as a front end to an attached voice mail system. This SRS provides a speech recognition control using a speech recognition proxy with a hairpin connection arrangement. When a subscriber calls the Voice Mail system, the subscriber gets connected to the SRS. The SRS automatically calls the Voice Mail system, thereby forming a hairpin connection. This hairpin connection is different, though, because the SRS has control over the voice paths to and from the subscriber and the Voice Mail system. Additionally, the SRS listens to the subscriber's line for speech or DTMF. When recognized, the SRS outputs to the Voice Mail system a DTMF equivalent response to the speech or DTMF received from the subscriber's line. This operation is why this method and apparatus is referred to as a speech recognition proxy.

DETAILED DESCRIPTION

Figure 1:
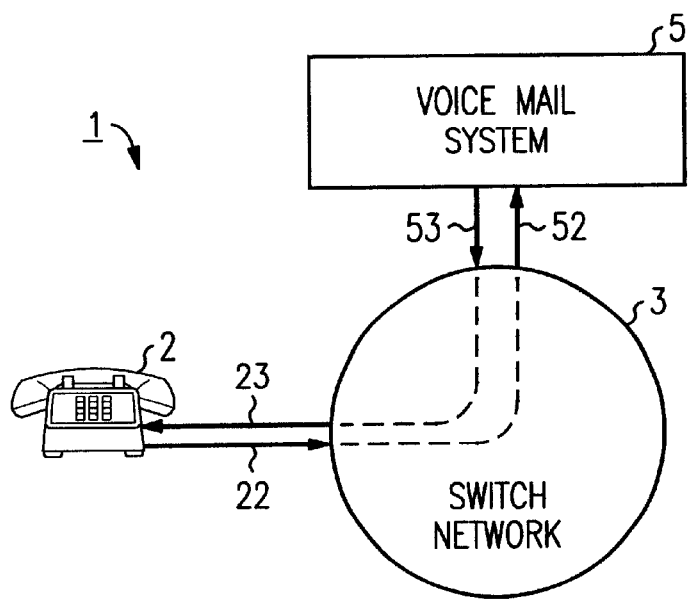
FIG. 1 is a block diagram of a standard DTMF controlled voice mail system.
Figure 2:
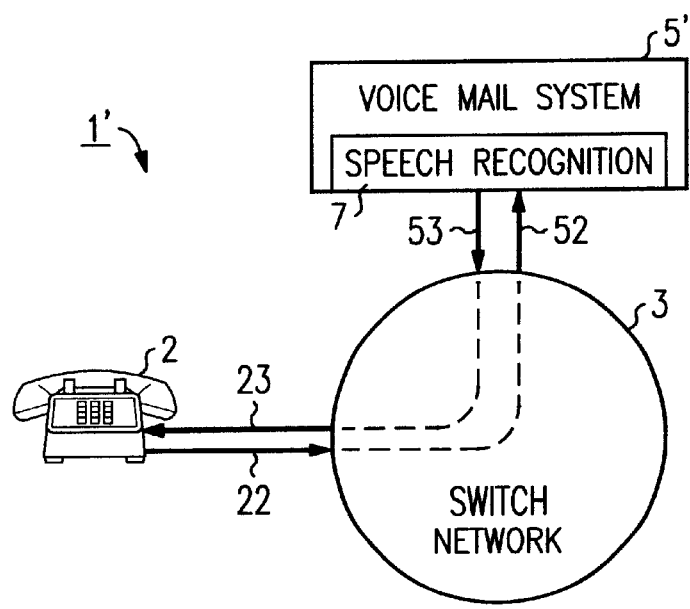
FIG. 2 is a block diagram of a known next generation voice mail system with speech recognition.

FIG. 1 is a block diagram of an arrangement 1 for controlling voice mail system functions using a legacy voice mail system 5 with DTMF control. Control is effected from station 2 via line 22, switch network 3 and line 52. FIG. 2 is a block diagram of a similar arrangement of a known arrangement 1' for providing a next generation voice mail system 5' with built in speech recognition control. The speech being inputted at station 2 and transmitted via line 22, switch network 3 and line 52. As mentioned in the background, the legacy voice mail system 5 shown in FIG. 1 does not provide speech recognition control and the next generation voice mail system 5' (shown in FIG. 2) that has speech recognition control 7 built in is an expensive replacement for the legacy system.

Figure 3:
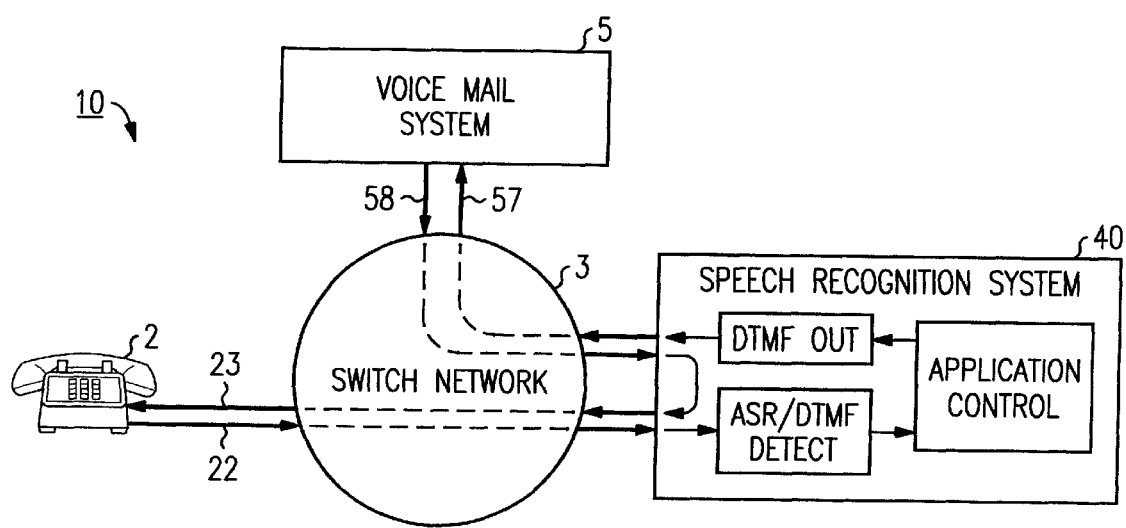
FIG. 3 is a block diagram of a system for practicing the invention.

The arrangement 10, shown in FIG. 3 is useful for practicing the present invention, which is a method and apparatus for speech recognition based control of a voice mail system. Arrangement 10 has an audio input/aural output unit 2. Unit 2 receives signals of acoustic energy from a subscriber and the environment and converts those signals to information signals that are transmitted along path 22 to switch network 3. Unit 2 can be a plain old telephone (POTS) station or some form of digital station such as an ISDN or computer and voice over the Internet system. Similar path 22 can be a POTS line if unit 2 is a POTS station, an ISDN line if unit 2 is an ISDN station, an TCP/IP line if unit 2 is a computer and voice over the Internet system, or some other digital protocol as required by unit 2.

Similarly, switch network 3 can be for a POTS service, and ISDN service or some digital service such as TCP/IP. For POTS and ISDN, the switch network can be based on a local telephone switch, such as a type 5ESS® electronic switch system manufactured by Lucent Technologies, 600 Mountain Road, Murray Hill N.J., who also own the trademark. For Internet and Intranet networks, switch network 3 may contain various servers and routers necessary to support TCP/IP based communications.

Switch network 3 is connected to voice mail system 5 via line 57, which is not the same as line 52 in FIG. 1 or 2. In FIG. 3, the signals from station 2, voice or DTMF, go through line 22, switch network 3, speech recognition system (SRS) 40, switch network 3 again, and then through line 57 to voice mail system 5. This differs from the systems shown in FIGS. 1 and 2 because of the presence of SRS 40. Further, the return path from voice mail system 5 to station 2 also goes through SRS 40. And, it is through the method and apparatus of the SRS 40 that speech recognition control is added to the arrangement 10. SRS 40 uses automatic speech recognition (ASR) for continuous recognition of speech such as generally available in many commercial offerings. The preferred ASR offering is the Speech Solutions package from Lucent Technologies. The Speech Solutions package is based on speech processing work such as describesd in U.S. Pat. No. 5,956,675 issued Sep. 21, 1999 to Anand Setlur and Rafid Sukkar; "A Wave Decoder for Continuous Speech Recognition" by Eric Burhke, Wu Chou and Qiru Zhou, Proc. ICSLP 1996 pp. 1–4; and "A Frame-Synchronous Network Search Algorithm for Connected Word Recognition" by Chin-Hui Lee and Lawrence Rabiner, IEEE Transactions on Acoustics, Speech and Signal Processing, vol. 37, No. 11 dated November 1989, pp. 1649–1658.

Figure 4:
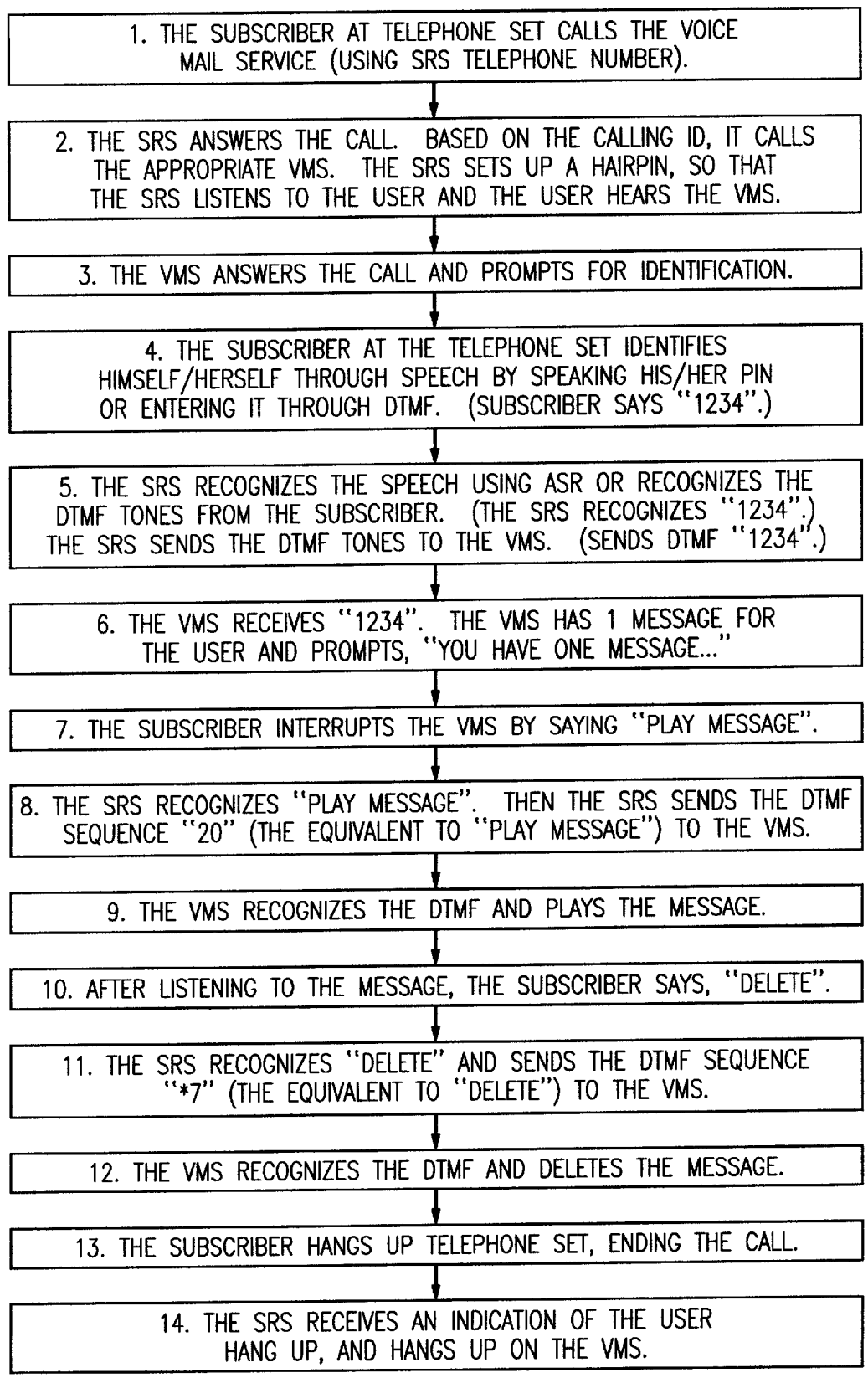
FIG. 4 is a call flow diagram of a subscriber listening to a voice mail message on a VMS and then deleting that message.

Referring now to FIGS. 3 and 4, an example scenario to help describe the arrangement accruing to the present invention is given. On an incoming call, the SRS 40 receives the call and automatically calls the VMS 5. The SRS 40 then connects the talk path of the VMS 5 back to the subscriber on station set 2 so that the subscriber hears the VMS 5. The SRS 40 also listens to the subscriber for speech or DTMF signals. When the subscriber speaks a speech command, the SRS 40 recognizes the command, maps the recognized command to one or more DTMF control signals and forwards the DTMF control signals corresponding to the spoken command to the VMS 5. The VMS 5 responds to the DTMF command(s) and the call continues.

There are no changes proposed to the way a message is left by callers. When someone (not the subscriber) leaves a message, all interactions are with the VMS 5, and not the SRS 40. The VMS 5 handles all calls that are forwarded because of a forward, busy, or no-answer. The existing mechanisms that indicate that a message is present (message waiting light and dial tone indications) remain the same as they were for the legacy VMS before the addition of SRS 40.

FIG. 4 describes steps of a method for a subscriber to access his/her voice messages on VMS 5. This interaction shown in FIG. 4 is of a subscriber first listening to a voice message on VMS 5 and then deleting it using the SRS 40.

Figure 5:
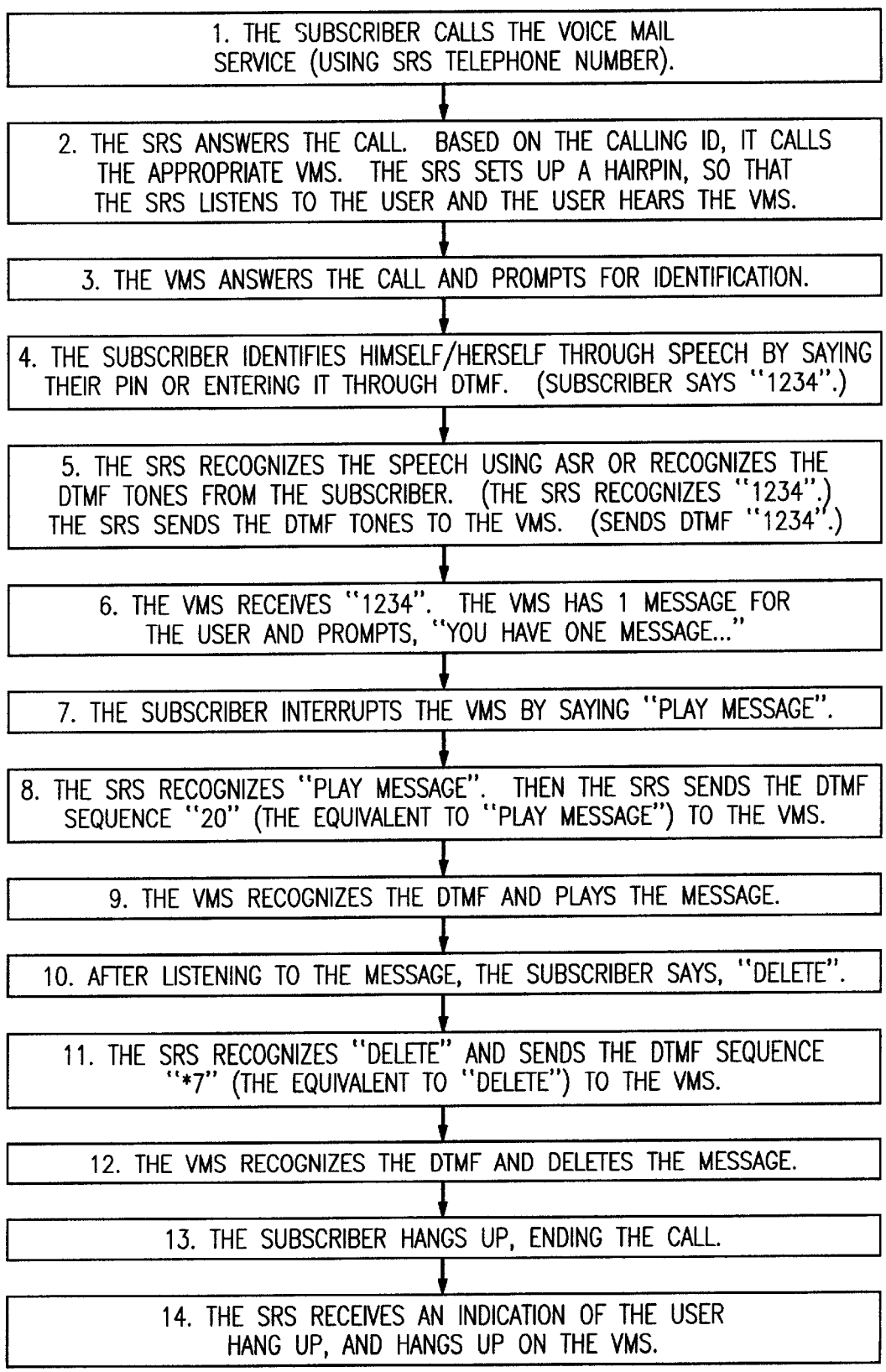
FIG. 5 is a call flow of a subscriber modifying the subscriber's greeting.

FIG. 5 describes steps of a method for a subscriber to modify his/her greeting that is presented to callers that are connected to VMS 5.

Figure 6:
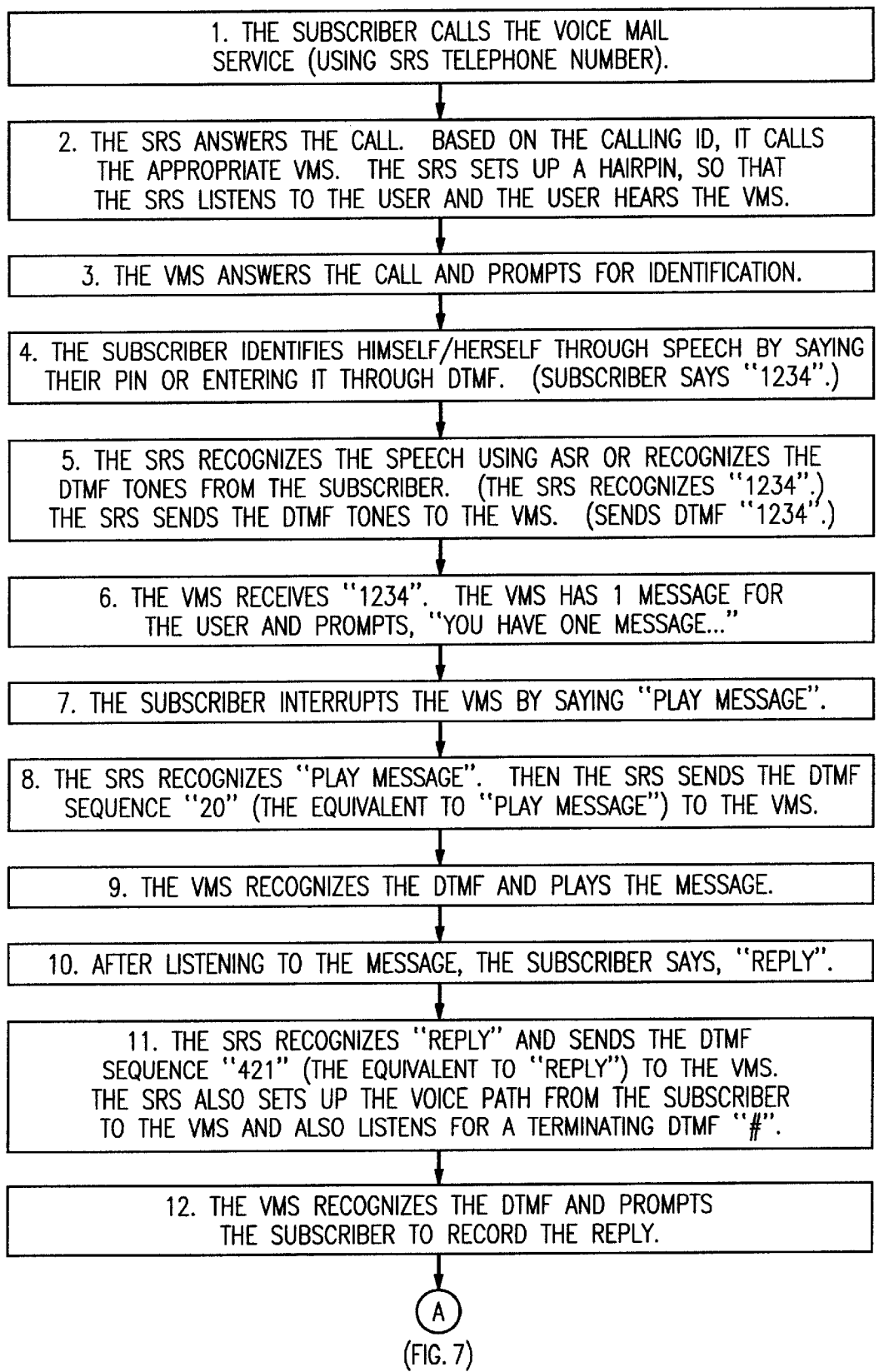
FIGS. 6 and 7 are a call flow of a subscriber listening to a voice mail message from VMS and replying to the message.
Figure 7:
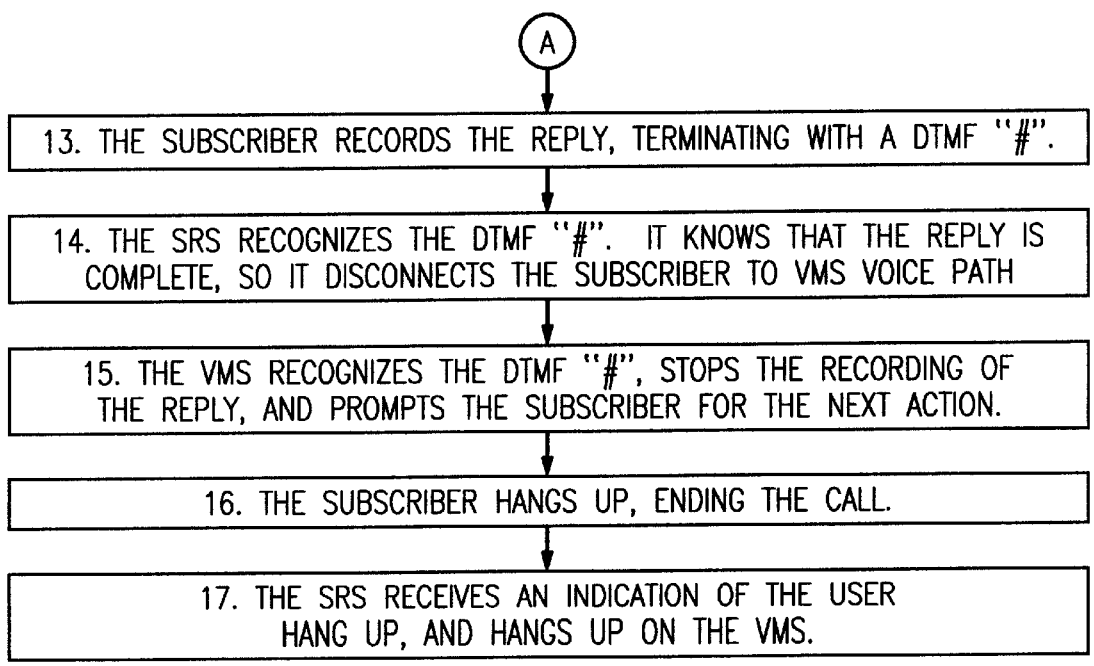

FIGS. 6 and 7 describes steps of a method for a subscriber to reply to a message that was left on VMS 5.

These examples provide a simple explanation, but the real application would be more complex. The SRS 40 would need to track the state of VMS 5 and its call flow, therefore, it would need to be aware of the different VMSs and which one it was connected to. It would need to be able to play prompts to the subscriber when the subscriber needed help, connect the subscribers voice path through to the VMS 5 when the subscriber was recording a greeting, etc. To provide a consistent interface, it would be desirable to record prompts for the SRS 40 using the same recording voice as the VMS 5.

The present invention has significant advantages over the control link interface approach shown in FIG. 2. In fact, the present invention eliminates the technical problems with the proprietary control interface altogether. In addition, the present invention facilitates centralization of the system instead of requiring each SRS functional unit to be co-located with the VMS or worry about slow, clunky interfaces. This centralization advantage can translate into significant systems cost savings. By the present invention, the Speech Recognition System 40 provides a means to provide enhanced services, including speech recognition based services, while protecting a company's significant investment in legacy voice mail systems.

Although this invention has been described with respect to a preferred embodiment, those skilled in the art may devise numerous other arrangements without departing from the scope of the invention as defined in the following claims. For example, other interactive response systems such as banking, financial, retail systems that now accept primarily DTMF, can be updated to be speech response systems by minor modifications to the user methods and the SRS 40. It is intended that the claims cover all such modifications that do not depart from the spirit and the scope of the invention.

What is claimed is:

1. An apparatus, comprising:

an input that receives speech commands over a network from a station set of a subscriber, said speech commands controlling a service being provided by a service unit with at least part of the service operation being controlled by control signals sent across the network;

a speech recognition unit, coupled to said input, that converts the speech commands into control signals;

an output that transmits the control signals over a public switched telephone network to the service unit that is located remote from the speech recognition unit;

wherein the commanded service function is delivered from the service unit through the network, through the speech recognition unit and subsequently to the station set of the subscriber.

2. The apparatus of claim 1, wherein said speech commands are converted into DTMF signals, which are the control signals.

3. The apparatus according to claim 1 further comprising a mechanism providing a hairpin call connection between the input and output at said speech recognition system such that the speech recognition system listens to the subscriber and at the same time the subscriber listens to the voice mail system.

4. A method for controlling a voice mail system comprising the steps of:

a. receiving a call from a subscriber over a public telecommunication network at a system providing speech recognition services and collecting a caller ID;

b. initiating another call to a voice mail system subscribed to by the subscriber based upon the caller ID, the another call originated by the system providing speech recognition services and placed over the public telecommunication network;

c setting up a hairpin call connection between the call and the another call at said speech recognition system such that the speech recognition system listens to the subscriber; and at the same time the subscriber listens to the voice mail system;

d. said speech recognition system converting speech commands received from the subscriber into control signals;

e transmitting the control signals over a public switched telephone network to the voice mail system that is located remote from the speech recognition system.

5. The method of claim 4 wherein the control signals comprise DTMF signals.

6. The method of claim 4 further comprising the step of receiving by the speech recognition system a personal identification number spoken by the subscriber and recognizing the personal indentification number by the speech recognition system.

7. A method for providing a speech recognition interface for a voice mail system comprising the steps of:

receiving a call at a speech recognition system speech commands from a subscriber transmitted over a telecommunication network;

translating the speech commands at the speech recognition system into control signals adapted for controlling the voice mail system;

originating another call from the speech recognition system to the voice mail system over the telecommunication network transmitting from the speech recognition system the control signals via the another call over the telecommunication network to the voice mail system.

8. The method according to claim 7 further comprising the step of establishing a hairpin call connection between the call and the another call through the telecommunication network so that the speech recognition system receives communications from the subscriber while simultaneously transmitting information from the voice mail system to the subscriber.

9. The method according to claim 7 further comprising the step of terminating a telephone call by the subscriber to the speech recognition system.

10. The method according to claim 7 wherein said translating step comprises identifying valid spoken commands that correspond to control signals understood by the voice mail system, and upon identifying a valid spoken command converting it into a DTMF signal that corresponds to the spoken command.

11. The method according to claim 8 wherein said translating step comprises identifying valid spoken commands that correspond to control signals understood by the voice mail system, and upon identifying a valid spoken command converting it into a DTMF signal that corresponds to the spoken command.

* * * * *